United States Patent [19]
Thomas et al.

[11] Patent Number: 5,526,427
[45] Date of Patent: Jun. 11, 1996

[54] UNIVERSAL BROADCAST CODE AND MULTI-LEVEL ENCODED SIGNAL MONITORING SYSTEM

[75] Inventors: William L. Thomas, Highlands Ranch, Colo.; Paul C. Kempter, Palm Harbor, Fla.; David H. Harkness, Wilton, Conn.

[73] Assignee: A.C. Nielsen Company, Northbrook, Ill.

[21] Appl. No.: 351,760

[22] Filed: Dec. 8, 1994

Related U.S. Application Data

[62] Division of Ser. No. 279,271, Jul. 22, 1994, Pat. No. 5,425,100.

[51] Int. Cl.$^6$ .............................. H04N 7/025; H04H 9/00
[52] U.S. Cl. ..................... 380/20; 455/2; 348/1; 348/467; 348/461
[58] Field of Search ................... 348/1, 461, 467; 455/2; 380/20

[56] References Cited

U.S. PATENT DOCUMENTS

| | | | |
|---|---|---|---|
| 2,833,859 | 5/1958 | Rahmel et al. | 179/2 |
| 3,919,479 | 11/1975 | Moon et al. | 179/1 |
| 3,973,206 | 8/1976 | Haselwood et al. | 325/455 |
| 4,048,562 | 9/1977 | Haselwood et al. | 325/31 |
| 4,230,990 | 10/1980 | Lert, Jr. et al. | 455/67 |
| 4,367,488 | 1/1983 | Leventer et al. | 358/147 |
| 4,425,578 | 1/1984 | Haselwood et al. | 358/84 |
| 4,547,804 | 10/1985 | Greenberg | 358/142 |
| 4,639,779 | 1/1987 | Greenberg | 358/142 |
| 4,677,466 | 6/1987 | Lert, Jr. et al. | 358/84 |
| 4,694,490 | 9/1987 | Harvey et al. | 380/20 |
| 4,723,302 | 2/1988 | Fulmer et al. | 455/2 |
| 4,739,398 | 4/1988 | Thomas et al. | 358/84 |
| 4,764,808 | 8/1988 | Solar | 358/84 |
| 4,805,020 | 2/1989 | Greenberg | 358/147 |
| 4,876,736 | 10/1989 | Kiewit | 455/2 |
| 4,930,011 | 5/1990 | Kiewit | 358/84 |
| 4,931,871 | 6/1990 | Kramer | 358/142 |
| 4,943,963 | 7/1990 | Waechter et al. | 370/94.1 |
| 4,945,412 | 7/1990 | Kramer | 358/142 |
| 4,967,273 | 10/1990 | Greenberg | 358/142 |
| 4,972,503 | 11/1990 | Zurlinden | 455/2 |
| 4,994,916 | 2/1991 | Pshtissky et al. | 358/181 |
| 5,200,822 | 4/1993 | Bronfin et al. | 358/142 |
| 5,200,825 | 4/1993 | Perine | 358/181 |
| 5,278,988 | 1/1994 | Dejean et al. | 455/2 |
| 5,280,479 | 1/1994 | Mary | 370/85.6 |
| 5,319,453 | 6/1994 | Copriviza et al. | 348/1 X |

*Primary Examiner*—Gilberto Barron, Jr.
*Attorney, Agent, or Firm*—Marshall, O'Toole, Gerstein, Murray & Borun

[57] ABSTRACT

A multi-level encoded signal monitoring system and a universal broadcast code are provided. A plurality of encoders are provided for encoding a predetermined program source signal. The program source signal has a plurality of sequential segments. Each encoder is arranged for selectively encoding information on uniquely specified segments. A plurality of unique source information message data are selectively encoded on the uniquely specified segments to define the universal broadcast code with each unique encoded source information message data being representative of a level of distribution of the program signal. The predetermined program source signal is received and the encoded information on selected specified segments is decoded.

79 Claims, 5 Drawing Sheets

| | INFORMATION MESSAGE | SEGMENT | DESCRIPTION |
|---|---|---|---|
| | NETWORK ID (STANDARD AMOL) | 2-3 | BINARY REPRESENTATION OF NETWORK SOURCE ID, TIME AND DATE INFORMATION. DOES NOT INCLUDE YEAR. |
| | LOCAL TV STATION ID | 5-6 | 5 CHARACTER CALL LETTERS |
| | | 7-8 | 3 DIGITS CHANNEL NUMBER. 2 DIGITS CURRENT YEAR. |
| | | 9-10 | BINARY REPRESENTATION OF LOCAL TIME AND DATE BASED ON SEGMENT 2-3 FORMAT. |
| UBC SIGNAL FORMAT | CABLE OR SATELLITE ID | 11-12 | 5 CHARACTER SATELLITE OR CABLE SYSTEM IDENTIFIER. |
| | | 13-14 | 2 DIGIT TRANSPONDER OR HEADEND. 3 DIGIT CHANNEL NUMBER. |
| | COMMERCIAL CODE | 15-16 | 5 CHARACTERS MAY REPRESENT FIRST FOUR ISCI CHARACTERS. |
| | | 17-18 | 5 CHARACTERS MAY REPRESENT SECOND FOUR ISCI |
| | SHOW ID (SYNDICATOR AMOL) | 20-21 | 3 CHARACTER PROGRAM PRODUCER, SYNDICATOR OR CLIENT 2 DIGIT YEAR CODE |
| | | 22-23 | 5 CHARACTER SHOW NAME OR TITLE. |
| | | 24-25 | 5 CHARACTER EPISODE IDENTIFIER. |
| | UNALLOCATED | 1,4,19, 26-30 | AVAILABLE FOR FUTURE USE. |

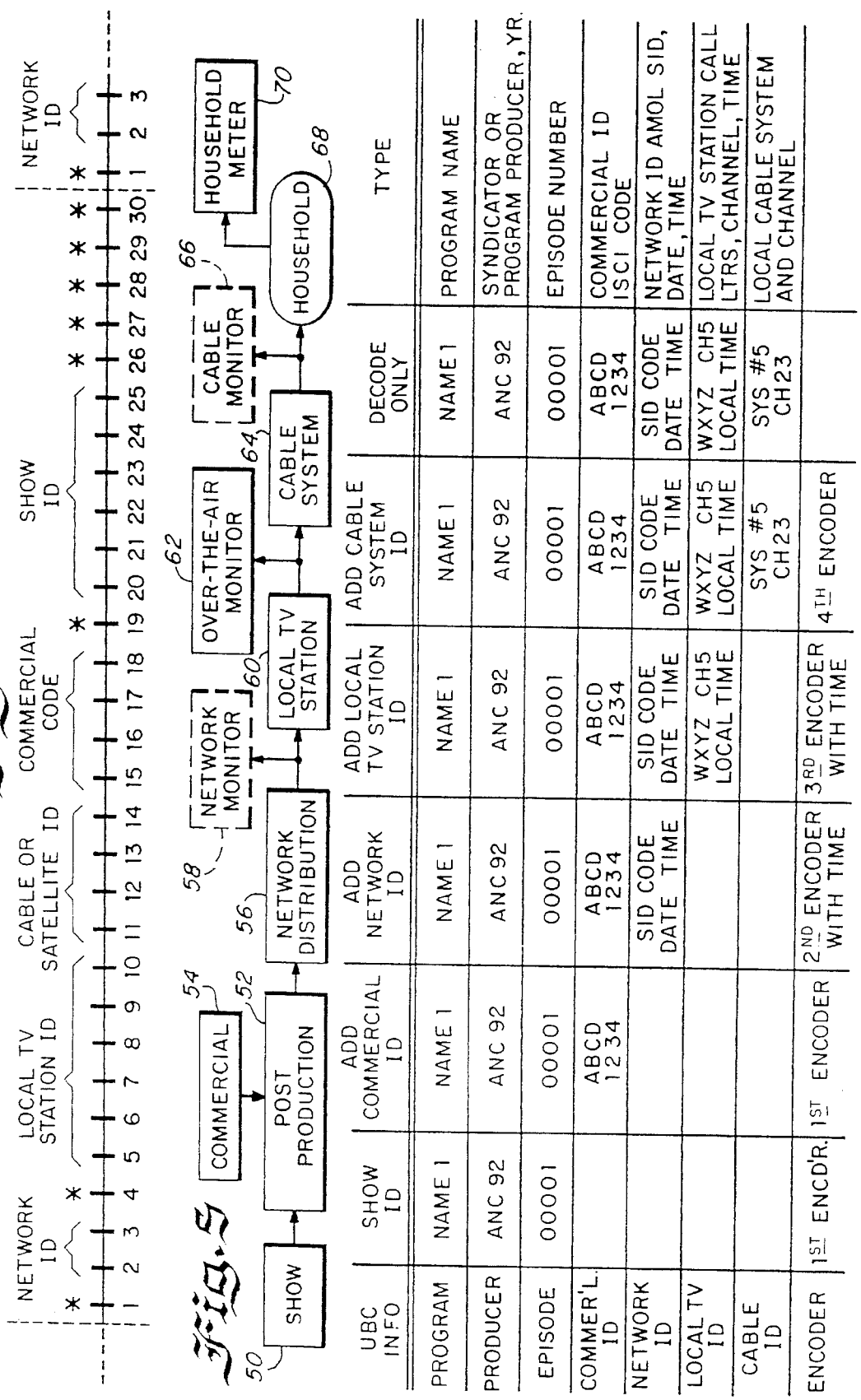

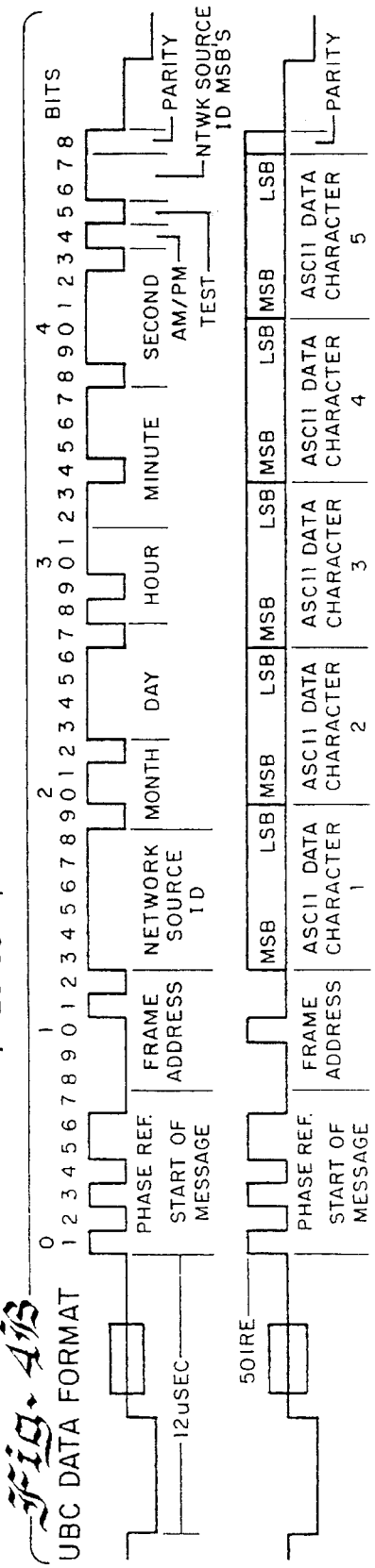

FIG. 4A — UBC SIGNAL FORMAT

| INFORMATION MESSAGE | SEGMENT | DESCRIPTION |
|---|---|---|
| NETWORK ID (STANDARD AMOL) | 2-3 | BINARY REPRESENTATION OF NETWORK SOURCE ID, TIME AND DATE INFORMATION. DOES NOT INCLUDE YEAR. |
| LOCAL TV STATION ID | 5-6 | 5 CHARACTER CALL LETTERS |
| | 7-8 | 3 DIGITS CHANNEL NUMBER. 2 DIGITS CURRENT YEAR. |
| | 9-10 | BINARY REPRESENTATION OF LOCAL TIME AND DATE BASED ON SEGMENT 2-3 FORMAT. |
| CABLE OR SATELLITE ID | 11-12 | 5 CHARACTER SATELLITE OR CABLE SYSTEM IDENTIFIER. |
| | 13-14 | 2 DIGIT TRANSPONDER OR HEADEND. 3 DIGIT CHANNEL NUMBER. |
| COMMERCIAL CODE | 15-16 | 5 CHARACTERS MAY REPRESENT FIRST FOUR ISCI CHARACTERS. |
| | 17-18 | 5 CHARACTERS MAY REPRESENT SECOND FOUR ISCI CHARACTERS. |
| SHOW ID (SYNDICATOR AMOL) | 20-21 | 3 CHARACTER PROGRAM PRODUCER, SYNDICATOR OR CLIENT 2 DIGIT YEAR CODE |
| | 22-23 | 5 CHARACTER SHOW NAME OR TITLE. |
| | 24-25 | 5 CHARACTER EPISODE IDENTIFIER. |
| UNALLOCATED | 1, 4, 19, 26-30 | AVAILABLE FOR FUTURE USE. |

FIG. 4B — UBC DATA FORMAT

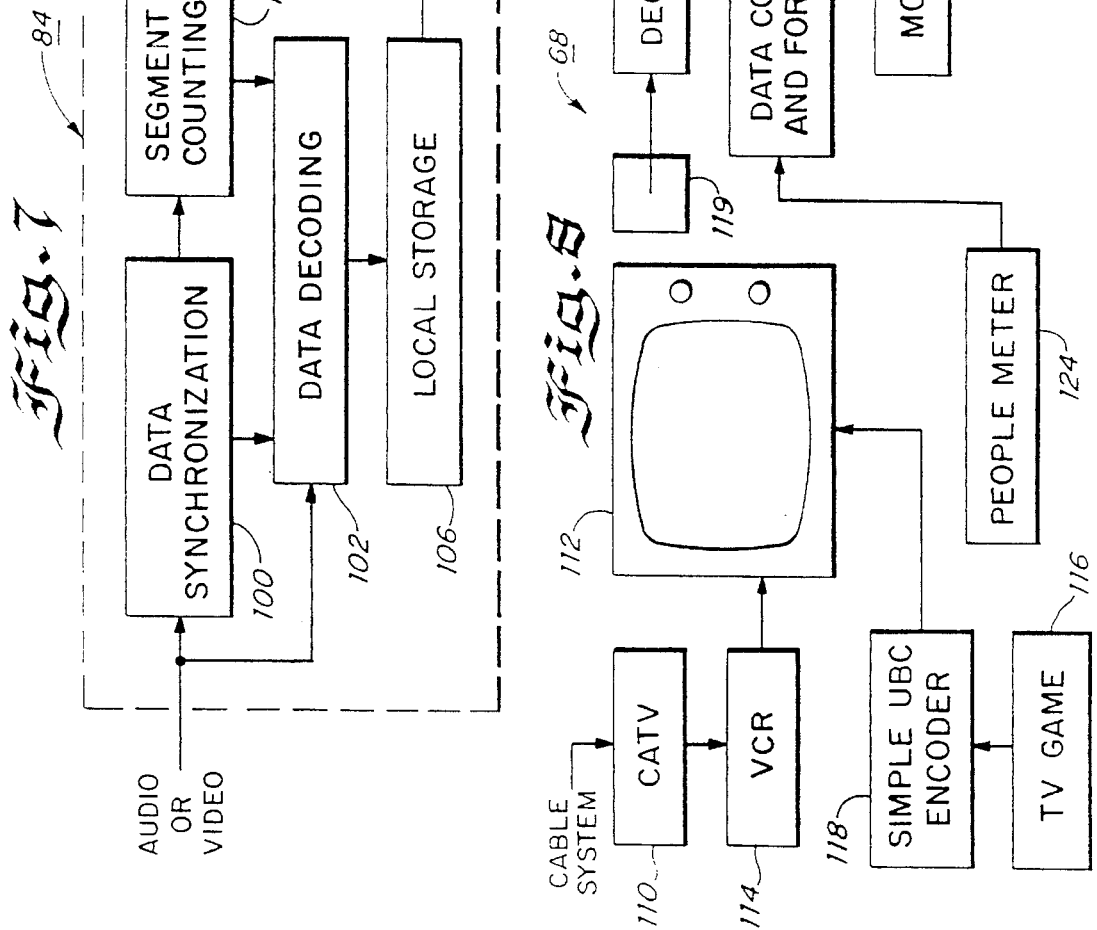

1

UNIVERSAL BROADCAST CODE AND MULTI-LEVEL ENCODED SIGNAL MONITORING SYSTEM

RELATED APPLICATION

The present application is a division of U.S. application Ser. No. 08/279,271, filed on Jul. 22, 1994, now U.S. Pat. No. 5,425,100.

BACKGROUND OF THE INVENTION

1. Field of the Invention

The invention relates generally to a method and apparatus for monitoring broadcast signals, and more particularly to a universal broadcast code, methods and apparatus for encoding and monitoring a signal.

2. Description of the Prior Art

With the growing diversification of program and delivery sources in today's marketplace, it has become increasingly difficult to measure television (TV) ratings based upon the association of channel viewed in the household with program lineup information separately collected via another system. In addition, there is growing interest, particularly on the part of syndicators, to have verified lineups that go beyond program level resolution. More specifically what is desired is commercial verification. Further, there is interest among local broadcasters to have very timely information regarding competitive commercial activity. Current commercial tracking systems which use passive pattern recognition technology have relatively long turnaround times in providing data to the local marketplace.

Various arrangements have been employed to determine the channel to which a radio and/or television receiver is tuned. Examples of receiver monitoring methods and apparatus for monitoring receivers are provided by U.S. Pat. Nos. 2,833,859; 3,973,206; 4,048,562, 4,425,578; 4,723,302; 4,764,808; 4,876,736; 4,930,011; 4,943,963; and 4,972,503. Other examples of receiver or broadcast signal monitoring methods and apparatus for monitoring receivers or broadcast signals are provided by U.S. Pat. Nos. 3,919,479; 4,230,990; 4,547,804; 4,639,779; 4,677,466; 4,739,398; 4,805,020; 4,931,871; 4,945,412 and 4,967,273. While these systems provide improvements over other known arrangements, a need exists for an economically effective system having flexibility to accommodate monitoring a broadcast signal and providing the ability to track and identify programs, commercials, promotions and other broadcast material for verification, program-lineup, audit and television audience measurement applications in a prompt and efficient manner.

SUMMARY OF THE INVENTION

Important objects of the present invention are to provide a method and apparatus for monitoring broadcast signals that overcome many of the disadvantages of the prior art systems; and to provide such method and apparatus for monitoring broadcast signals that can be effectively and efficiently configured for providing the ability to track and identify programs, commercials, promotions and other broadcast material for verification, program-lineup, audit and television rating applications.

In brief, the objects and advantages of the present invention are achieved by a multi-level encoded signal monitoring system and a universal broadcast code (UBC). A plurality of encoders are provided for encoding a predetermined program source signal. The program source signal has a plurality of sequential segments. Each encoder is arranged for selectively encoding information on unique specified segments.

A plurality of unique source information message data are selectively encoded on the unique specified segments to define the universal broadcast code with each unique encoded source information message data being representative of a level of distribution of the program signal. The predetermined program source signal is received and the encoded information on selected specified segments is decoded.

As used throughout this description and in the appended claims, the term "segment" is intended to include time slots with or without gaps in audio and video signal sources and digital transmission systems.

BRIEF DESCRIPTION OF THE DRAWING

The present invention together with the above and other objects and advantages may best be understood from the following detailed description of the embodiment of the invention illustrated in the drawings, wherein:

FIG. 4 is a chart illustrating a predetermined format of a universal broadcast code of the multi-level encoded signal monitoring system of FIG. 1;

FIG. 4A is a chart illustrating the detailed information messages and segment assignments for the format shown in FIG. 4;

FIG. 4B is a detailed timing diagram showing a UBC data segment;

FIG. 5 is a block diagram and chart illustrating an example of UBC encoding of the multi-level encoded signal monitoring system of FIG. 1;

FIGS. 6–8 are block diagrams illustrating broadcast signal monitoring and television audience measurement apparatus of the monitoring system of FIG. 1.

DETAILED DESCRIPTION OF THE PREFERRED EMBODIMENT

Figure 1:
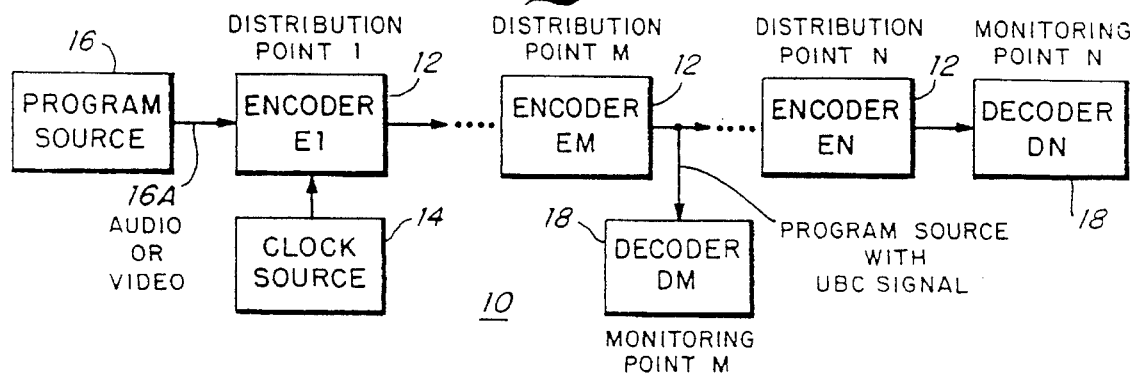
FIG. 1 is a block diagram of a multi-level encoded signal monitoring system according to the present invention.

Referring now to the drawing, with particular attention to FIG. 1, there is illustrated a block diagram of a new and improved multi-level encoded signal monitoring system according to the invention generally designated by the reference numeral 10. While the multi-level encoded signal monitoring system 10 is depicted and generally described herein for monitoring a broadcast signal, the principles of the present invention are applicable to monitoring television receivers, video cassette recorders and other receivers and television viewing and listening habits of individual audience members or panelists of cooperating households.

Multi-level encoded signal monitoring system 10 includes a plurality of signal encoders E1-EN generally designated by the reference character 12. A corresponding encoder 12 at each stage E1-EN of distribution adds unique identification (ID) information messages to an audio and/or video program source signal 16A provided by a program source 16. It is to be understood that the audio and/or video program source signal 16A may be of continuous analog or digital format. As shown, a clock 14 for providing a time stamp is coupled to the first signal encoder E1. Clock 14 is not required for each of the signal encoders 12 and is provided when local time information is required. Each signal encoder 12 encodes selected, source identification data together with time of occurrence data at predefined segments for each level of distribution, for example, such as, is illustrated in FIGS. 4 and 5. For example, if the source identification data is to be encoded in the video signal provided by the program source 16, the segments of a UBC may be encoded into corresponding frames of the video signal. Since video signals are broadcast at a rate of thirty frames per second, and if the frames within one second of a broadcast video signal are numbered from one to thirty, segment 2 of the UBC may be inserted into frame 2, segment 3 of the UBC may be inserted into frame 3, etc., with certain segments being withheld for later allocation. The segments may be inserted into the corresponding frames using line 20, line 21 or line 22 or a combination of these lines of the video program source signal. Additionally or alternatively, the predefined segments can include predefined sub-audible time slots of an audio program source. A basic sub-audible encoding system with a single information message is described in U.S. Pat. Nos. 4,931,871 and 4,945,412 issued to Robert A. Kramer of Santa Monica, Calif. Also with digital transmission systems, the predefined segments can be encoded in a separate data sub-channel. Each UBC signal encoder 12 is arranged to allow ID information messages to be added on specified segments only without overwriting any existing encoded data on other segments of the program source signal. The multilevel encoded signal monitoring system also includes a plurality of signal decoders DM-DN generally designated by the reference character 18. A corresponding decoder 18 at selected stages of distribution is used to monitor the UBC signals comprised of ID information messages which have been added to a program source 16.

Figure 2:
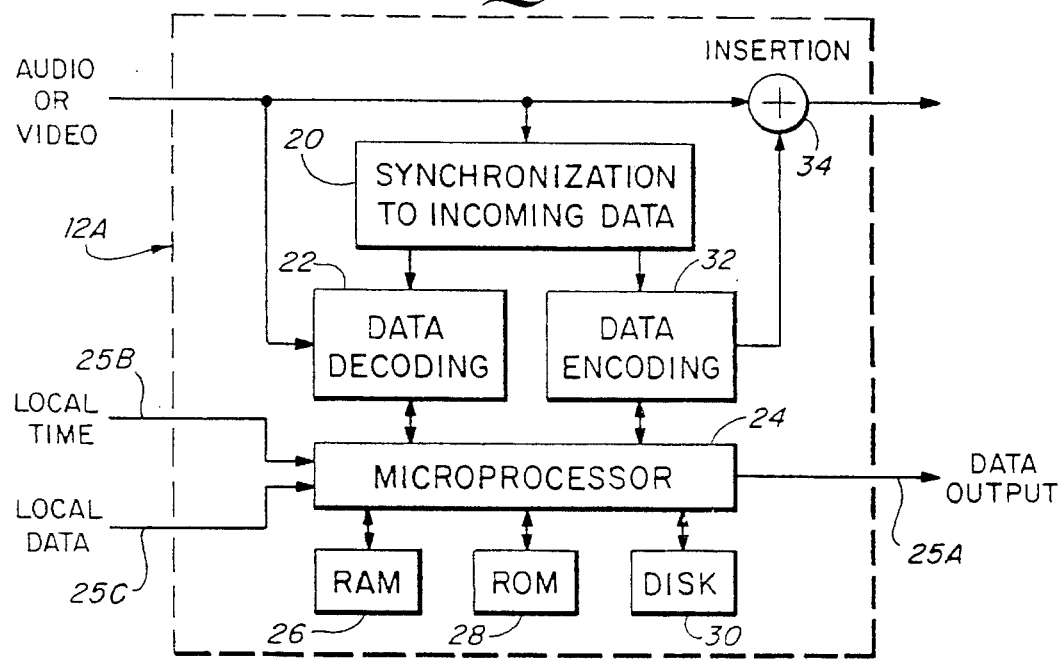
FIG. 2 is a block diagram of a smart UBC encoder of the multi-level encoded signal monitoring system of FIG. 1.

Referring now to FIG. 2, a UBC signal encoder generally designated 12A is shown. UBC signal encoder 12A receives an audio or video input signal indicated at a line labelled AUDIO OR VIDEO that is applied to a synchronization block 20 for synchronization to the incoming data and a data decoding block 22 for decoding the incoming data. Data decoding block 22 couples decoded incoming data to a microprocessor 24. Various commercially available devices can be used for the microprocessor 24, such as, for example an 80286 microprocessor manufactured and sold by Intel Corp of Santa Clara, Calif. Associated memory devices coupled to the microprocessor 24 include a random access memory (RAM) 26, a read only memory (ROM) 28 and a direct access storage device (DASD) disk unit 30. Additional optional inputs to the microprocessor 24 include a local time signal 25B and a local data signal 25C having a content depending upon the location of the UBC signal encoder 12A in the distribution system 10. Microprocessor 24 provides a data output for local performance monitoring indicated at a line labelled 25A and is coupled to a data encoding block 32. Synchronization block 20 provides a synchronizing signal to the data decoding block 22 and the data encoding block 32. Encoded information provided by the data encoding block 32 is inserted onto the program source signal via an adder or insertion block 34. Simple encoders for adding identification information already exist for other broadcast applications. For example, EEG Enterprises of Farmingdale, N.Y. makes a model EN270 encoder for the conventional line 21 captioning system. Also, VASGO Inc. of Valley Stream, N.Y. makes a model SGR-38 encoder for the AMOL system. With the modifications as illustrated in FIG. 2, existing encoders could be upgraded to perform as an UBC signal encoder. For example, the SGR-38 encoder can be modified by changing its data decoding hardware and microprocessor program to recognize the segment timing of existing AMOL code, and then insert UBC information messages representative of the level of program distribution into the appropriate program source signal segments.

Figure 9:
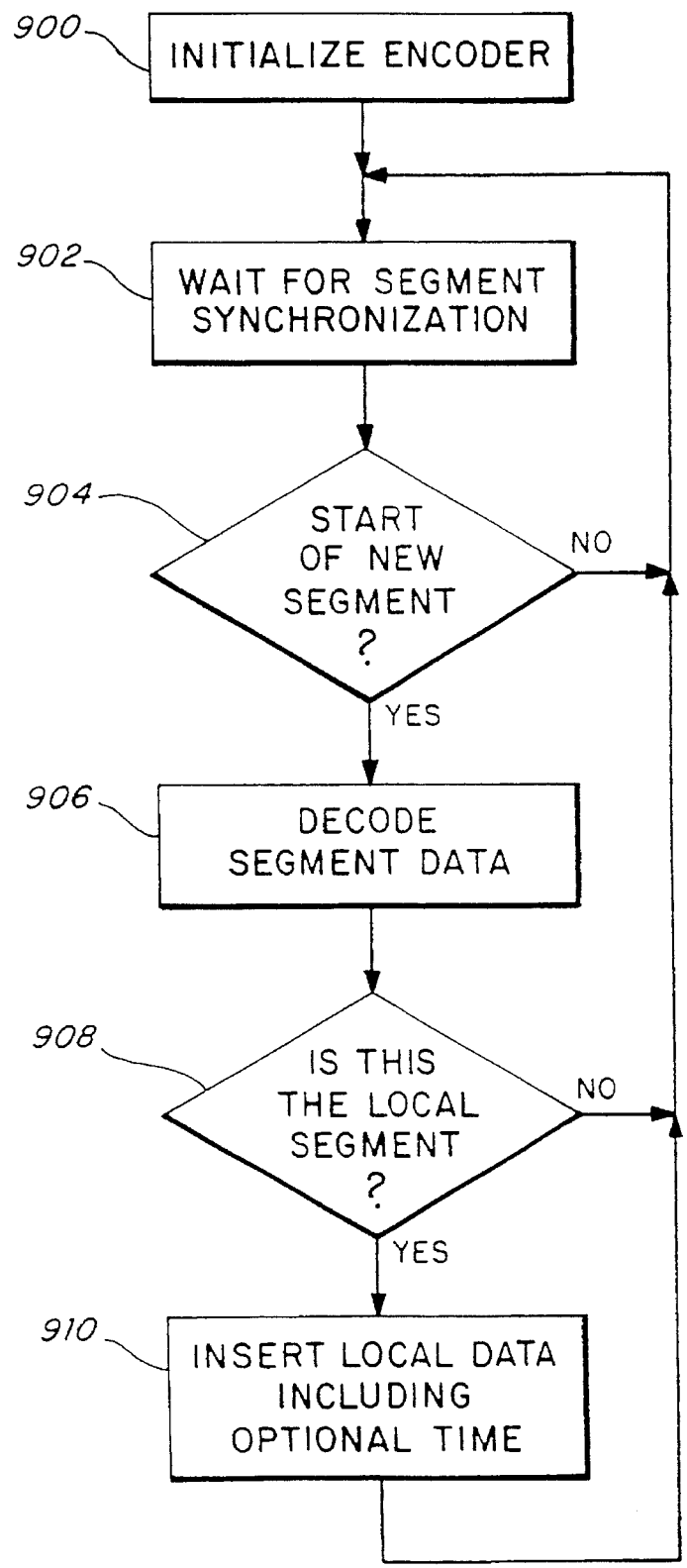
FIG. 9 is a logic flow diagram illustrating logical steps performed by the smart UBC encoder of the multi-level encoded signal monitoring system of FIG. 1.

Referring also to FIG. 9, there is shown the logical steps performed by the microprocessor 24 of the UBC signal encoder 12A. As indicated at a block 900 labelled INITIALIZE ENCODER, the sequential operations begin upon power-up with an initialization operation by the microprocessor 24 to initialize the encoder 12A utilizing programs stored in ROM 28 and DASD disk unit 30. The initialization operation includes initializing predefined memory locations of RAM 26 and the communications ports 25A, 25B, 25C.

Next at a block 902 labelled WAIT FOR SEGMENT SYNCHRONIZATION, the microprocessor 24 waits for the start of a segment identified by the synchronization to incoming data block 20. Then at a decision block 904 labelled START OF NEW SEGMENT?, the microprocessor 24 identifies the start of a new segment. When the start of a new segment is not identified by the microprocessor 24 at decision block 904, then the sequential operations return to block 902 and continue until the start of a new segment is identified. Once a new segment is found at decision block 904, any previously encoded data is decoded by the data decoding block 22 to identify the segment identification as indicated at a block 906 labelled DECODE SEGMENT DATA. Alternatively, decoding of the segment identification can be determined directly by the synchronization block 20.

Next it is determined if the segment corresponds to a local level of distribution, as indicated at a decision block 908 labelled IS THIS THE LOCAL SEGMENT? If not, the sequential operations return to block 902 and continue until the start of a new segment is identified. Otherwise, when determined that the segment corresponds to a local level of distribution at the decision block 908, then the appropriate data is encoded using the data encoding block 32 via the insertion block 34 as indicated at a block 910 labelled INSERT LOCAL DATA INCLUDING OPTIONAL TIME. The encoded data optionally includes local time together with the ID information message. As an option, either the local encoded data indicated at lines 25B and 25C in FIG. 2, or any previously encoded data decoded by the data decoding block 22, is presented at the data output port 25A for local monitoring purposes.

Figure 3:
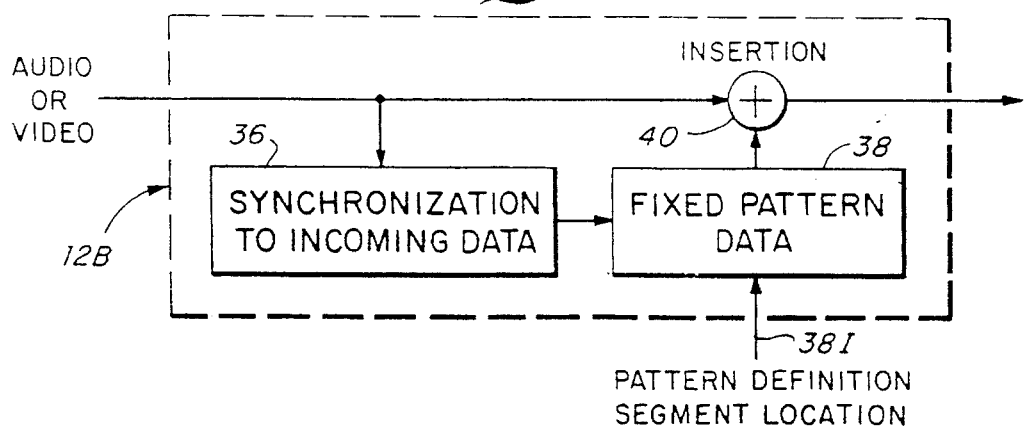
FIG. 3 is a block diagram of another simplified UBC encoder of the multi-level encoded signal monitoring system of FIG. 1.

FIG. 3 illustrates another UBC signal encoder generally designated 12B. UBC signal encoder 12B receives an audio or video input signal indicated at a line labelled AUDIO OR VIDEO that is applied to a synchronization block 36 for synchronization to the incoming data. Synchronization block 36 is coupled to a fixed pattern information message data block 38. An information message definition and segment location input indicated at a line 38I is applied to the fixed pattern data block 38. The information message definition and segment location input 38I can be simply defined by, for example, selecting switch settings. Encoded information provided by the fixed pattern data block 38 is combined on selected specified segments via an insertion block 40.

Referring now to FIG. 4, based on extensions to the Automated Measurement of Lineups (AMOL) signal used by the television networks (ABC, CBS, FOX, NBC) and major program syndicators (Paramount, Warner, Camelot and others), the multiple signal encoders 12 together define a universal broadcast code (UBC) encoded signal having a predefined information message format defining each level of distribution, for example, such as, is illustrated. The universal broadcast code UBC encoded signal is encoded with program data requiring cooperation by multiple levels of distribution including advertisers and their agencies, program providers, syndicators, broadcast and cable networks, local TV stations, and satellite or cable systems. Predefined segments of the UBC are used for a level of distribution. As shown, segments 2–3 store encoded data representing a source identification (SID) code and a time/date stamp information message for each uniquely assigned network. Segments 5–10 store encoded information message data representing call letters, channel number and local time for each uniquely assigned local television station. Segments 11–14 store encoded information message data representing system number and channel number for cable information or satellite identification. Segments 15–18, designated COMMERCIAL CODE, store encoded information message data representing a national commercial or a local station commercial. Segments 20–25, designated SHOW ID, store encoded information message data representing syndicator or program producer name, program name and episode number. Segments 1, 4, 19 and 26–30 are unallocated. These segments can be used for future expansion if required. They can also be used by the simple encoder 12B. An overall checksum, such as a standard CRC code, can be included in segments 29–30 if desired for overall system reliability of all 30 segments.

Additionally it should be understood that variable length information messages can be defined for each set of data using a start code, information data and a stop code to define each segment. In this case, time gaps are required for segment insertion at each level of distribution. Such a method for using variable length information messages is similar to the technique used for transmitting information in the conventional line 21 captioning system, as described in the Federal Communications Commission rules and regulations, parts 15 and 73.

With program sources that originate within the household, unallocated segments can be used for identifying this source. A UBC encoder 12B as shown in FIG. 3 can be used for household originated program sources. For example, at the output of a device such as a video game, a low cost, fixed ID encoder 12B can be attached. As the TV selects or tunes to this video game source, the ID information message of the video game would be present at the output of the TV.

FIG. 4A provides an example of UBC signal information messages and corresponding segment allocations based on extensions to the existing AMOL signal. It is to be understood that many such assignments could be made and this is provided as an illustrative example only. Segments 2–3 are based on the current AMOL system as used by television networks for over 15 years. Segments 20–25 are based on an extension made to this original AMOL system by program syndicators five years ago. Additional UBC information messages for local TV station identification, cable system or satellite distribution and commercial identification are described and can also be simple extensions of the network ID currently inserted into segments 2 and 3 of the video broadcast signal. It is the combination of some or all of these information messages, each of which is representative of a level of distribution, that comprises the UBC signal.

FIG. 4B shows the details of the segments described in FIG. 4A. Based on extensions to the current AMOL signal, both a binary and ASCII segment format are shown. It is to be understood that many such assignments could be made and this is provided as an illustrative example only. Each segment includes 48 bits of data. The binary format for a network ID segment, for example, includes start of message, frame address, network source ID, month, day, hour, minute, second and status elements. The ASCII segment includes start of message, frame address and five characters. Using these segment definitions, it is possible to encode information messages, representative of a level of distribution, that comprises the UBC signal.

FIG. 5 provides a block diagram and chart illustrating an example of UBC encoding of the multi-level encoded signal monitoring system 10. A first program source at a block 50 labelled SHOW is coupled to a first encoder distribution block 52 labelled POST PRODUCTION, having an input from a block 54 labelled COMMERCIAL. The encoder 52 inserts commercial and show identification codes into the program source signals of corresponding commercials and shows. Next a second encoder distribution block 56 labelled NETWORK DISTRIBUTION adds network identification codes to the program source signal. A first optional monitoring block 58 shown in dotted line and labelled NETWORK MONITOR can be provided for monitoring the output of network distribution block 56. A third encoder distribution block 60 labelled LOCAL TV STATION adds local TV station identification codes to the program source signal. A monitoring block 62 labelled OVER-THE-AIR MONITOR monitors the output of the local TV station block 60. Next a fourth encoder distribution block 64 labelled CABLE SYSTEM adds cable system identification codes to the program source signal. Another optional monitoring block 66 shown in dotted line and labelled CABLE MONITOR can be provided for monitoring the output of cable system distribution block 64. A first decoder block 68 labelled HOUSEHOLD provides an input to a household metering block 70 labelled HOUSEHOLD METER for decoding the UBC encoded signal. A household metering function is illustrated and described with respect to FIG. 8.

FIG. 6 illustrates a signal monitoring system 80 for monitoring a predetermined signal having a selected frequency received from an antenna, satellite dish, wireless cable, or a cable system 82. A UBC decoder 84 coupled to a standard receiver 86 processes the monitored program signal and recovers the encoded data at the point of reception and applies the information to a data collection and forward unit 88. A modem 90 can be used to couple the collected data to a central computer 92 via a modem 94 associated with the central computer 92 and communications links generally designated by the reference character 96. The data collection and forward unit 88 can be comprised of an industrial embedded computer such as the CoreModule™/286 manufactured and sold by Ampro Computers, Inc. of Sunnyvale, Calif. The modem 90 can be a MiniModuleTM/Modem from the same company. This computer can operate under the MS-DOS® operating system sold by Microsoft Corporation of Redmond, Wash. A device such as the Optima 96 model manufactured and sold by Hayes of Atlanta, Ga. can be used for modem 94. The decoder 84, the receiver 86, the data collection and forward unit 88, and the modem 90 may be used for each of the monitors 58, 62 and 66 of FIG. 5.

Central computer 92 collects and processes the monitored data from each of the signal monitors, such as monitors 58, 62 and 66 of FIG. 5 to provide signal and program analysis and reports. Central computer 92 periodically resets the real time clock of the signal monitor, included in the data collection and forward unit 88, to facilitate accurate time stamping of the monitored signal data. It should be understood that various conventional arrangements can be used for the communication links 96, for example, such as, via telephone lines connected to the public switched telephone network, cellular telephone, or via mailable memory devices. Various commercially available personal computers having standard capabilities can be used for the central computer 92, for example, such as a model Deskpro 486S/25M manufactured and sold by Compaq Corporation of Houston, Tex. Central computer 92 could operate under the OS/2® operating system supplied by International Business Machines of White Plains, N.Y.

FIG. 7 illustrates the UBC decoder 84 which includes a data synchronization block 100 and a data decoding block 102 receiving incoming data at a line labelled AUDIO OR VIDEO. The synchronization block 100 and the data decoding block 102 can be implemented, for example, using field programmable logic arrays (FPLA) or other commercially available devices. One such device is the XC3064 from Xilinx, Inc. of San Jose, Calif. Synchronization block 100 provides an input to the data decoding block 102 and to a segment counting block 104. Segment counting block 104 provides an input to the data decoding block 102. The data synchronization block 100 and segment counting block 104 provide the necessary timing signals for proper recovery of the UBC code by the data decoding block 102. If the program signal, which is encoded with the UBC, is the video portion of a broadcast signal, the segment counter 104 may count vertical and horizontal sync pulses so that the information messages can be decoded from the appropriate lines and frames into which the messages are inserted. The decoded output of the data decoding block 102 is applied to a local storage block 106 and coupled to the data collection and forward unit 88. Decoders of similar capabilities have been designed as single integrated circuits for other applications. For example, Philips Semiconductors of South Hampton, England offers the SAA5252 Line Twenty One Decoder (LITOD) and the SAA5248 Integrated VIP and Teletext (IVT) decoder chips.

FIG. 8 illustrates a typical household metering site 68 including a signal input from a cable system to a CATV converter 110. A standard TV receiver 112 receives the CATV input signal via a video cassette recorder (VCR) 114. A TV game device 116 is coupled to the TV receiver 112 via a simple UBC encoder 118, for example, such as UBC encoder 12B in FIG. 3. A video or audio pick-up probe 119 positioned near the monitored TV receiver 112 is used for extracting the UBC codes. Non-intrusive probes 119 can include a photo sensor for video signal, a microphone for audio signal, or an intermediate frequency (IF) probe for composite audio and video signal pickup. As part of probe 119, any necessary signal demodulation circuitry would be provided. In some cases, the probe 119 can make a direct connection to audio or video outputs from the TV. A UBC decoder 120, such as the decoder 84 shown in FIG. 7, is coupled to the probe 119 and applies its decoded output to a data collection and forward unit 122. As shown, a people meter attachment 124 also is coupled to the data collection and forward unit 122 for providing audience measurement data. A modem 126 can be used to couple the collected data to the central computer 92 via communication link 96.

While the invention has been described with reference to details of the illustrated embodiment, these details are not intended to limit the scope of the invention as defined in the appended claims.

What is claimed and desired to be secured by Letters Patent of the United States is:

1. Apparatus for monitoring an universal broadcast code (UBC) which has been encoded on a program signal comprising:

means for receiving said universal broadcast code; and, decoding means responsive to said receiving means for decoding at least first and second distribution level identification data, wherein the first distribution level identification data is selectively encoded on a first segment of said universal broadcast code, wherein the second distribution level identification data is selectively encoded on a second segment of said universal broadcast code, wherein said first segment extends over at least a first frame of a broadcast signal, wherein the second segment extends over a second frame of the broadcast signal, wherein the first and second frames are different frames, wherein said first and second distribution level identification data uniquely identify corresponding levels of distribution of said program signal, and wherein at least two of said levels of distribution are located remotely from one another.

2. The apparatus of claim 1 further comprising means coupled to said decoding means for storing decoded distribution level identification data.

3. The apparatus of claim 2 further comprising means for storing a current time reference with said decoded distribution level identification data.

4. The apparatus of claim 2 further comprising means coupled to said decoding means for communicating with a central computer to transfer said stored distribution level identification data to said central computer.

5. The apparatus of claim 1 wherein said program signal is a television program signal, wherein said receiving means comprises synchronizing means for synchronizing to said television program signal, and wherein said synchronizing means is coupled to a television receiver.

6. The apparatus of claim 5 further comprising means coupled to said decoding means for storing decoded distribution level identification data and means coupled to said storing means for communicating with a central computer to transfer said stored distribution level identification data to said central computer.

7. The apparatus of claim 1 wherein said program signal is a television program signal, wherein said receiving means comprises synchronizing means for synchronizing to said television program signal, and wherein said synchronizing means is coupled to a television network distribution point of a television network.

8. The apparatus of claim 1 wherein said program signal is a television program signal, wherein said receiving means comprises synchronizing means for synchronizing to said television program signal, and wherein said synchronizing means is coupled to an output of a local television station.

9. The apparatus of claim 1 wherein said program signal is a television program signal, wherein said receiving means comprises synchronizing means for synchronizing to said television program signal, and wherein said synchronizing means is coupled to an output of a cable system.

10. The apparatus of claim 1 wherein said program signal is a television program signal, wherein said receiving means comprises synchronizing means for synchronizing to said television program signal, and wherein said synchronizing means is coupled to an output of a satellite system.

11. The apparatus of claim 1 wherein said program signal is a television program signal, and wherein said receiving means comprises coupling means for coupling said decoding means to said television program signal.

12. The apparatus of claim 11 wherein said coupling means comprises a photo sensor.

13. The apparatus of claim 11 wherein said coupling means comprises a microphone.

14. The apparatus of claim 11 wherein said coupling means comprises an intermediate frequency probe.

15. The apparatus of claim 11 wherein said coupling means comprises a direct connection.

16. The apparatus of claim 11 wherein said receiving means comprises synchronizing means for synchronizing to said program signal.

17. An apparatus for monitoring an universal broadcast code which is encoded on a television and/or radio signal comprising:

means for receiving said universal broadcast code; and, decoding means responsive to said receiving means for decoding at least first and second distributor identifiers, wherein the first distributor identifier is selectively encoded within a first segment of said universal broadcast code which is encoded on said television and/or radio signal, wherein the second distributor identifier is selectively encoded within a second segment of said universal broadcast code which is encoded on said television and/or radio signal, wherein said first and second segments are separated in time so that the first and second distributor identifiers do not reside in a common frame of a television portion of said television and/or radio signal, and wherein said first and second distributor identifiers uniquely identify corresponding distributors of said television and/or radio signal.

18. The apparatus of claim 17 further comprising means coupled to said decoding means for storing decoded distributor identifiers.

19. The apparatus of claim 18 further comprising means coupled to said decoding means for communicating with a central computer to transfer said stored distributor identifiers to said central computer.

20. The apparatus of claim 17 further comprising means for storing a current time reference with said decoded distributor identifiers.

21. The apparatus of claim 17 wherein said universal broadcast code which is encoded on said television and/or radio program signal is an universal broadcast code which is encoded on a television signal, wherein said receiving means comprises synchronizing means for synchronizing to said encoded television signal, and wherein said synchronizing means is coupled to a television receiver in order to synchronize to said encoded television signal.

22. The apparatus of claim 21 further comprising means coupled to said decoding means for storing decoded distributor identifiers and means coupled to said storing means for communicating with a central computer to transfer said stored distributor identifiers to said central computer.

23. The apparatus of claim 17 wherein said universal broadcast code which is encoded on said television and/or radio signal is an universal broadcast code which is encoded on a television signal, wherein said receiving means comprises synchronizing means for synchronizing to said encoded television signal, and wherein said synchronizing means is coupled to a television network distribution point of a network distributor.

24. The apparatus of claim 17 wherein said universal broadcast code which is encoded on said television and/or radio signal is an universal broadcast code which is encoded on a television signal, wherein said receiving means comprises synchronizing means for synchronizing to said encoded television signal, and wherein said synchronizing means is coupled to an output means of a local television station.

25. The apparatus of claim 17 wherein said universal broadcast code which is encoded on said television and/or radio signal is an universal broadcast code which is encoded on a television signal, wherein said receiving means comprises synchronizing means for synchronizing to said encoded television signal, and wherein said synchronizing means is coupled to an output of a cable system.

26. The apparatus of claim 17 wherein said universal broadcast code which is encoded on said television and/or radio signal is an universal broadcast code which is encoded on a television signal, wherein said receiving means comprises synchronizing means for synchronizing to said encoded television signal, and wherein said synchronizing means is coupled to an output of a satellite system.

27. A universal broadcast code (UBC) encoded program signal comprising:

at least first and second segments of said program signal, wherein said first segment occurs within at least a first time period of the program signal, wherein the second segment occurs within at least a second time period of the program signal, wherein the first and second time periods are equivalent in time to a frame of a video signal, and wherein the first and second time periods are different time periods; and, at least first and second distribution level identification data, wherein the first distribution level identification data is encoded within the first segment of said program signal, wherein the second distribution level identification data is encoded within the second segment of said program signal, wherein said first and second distribution level identification data uniquely identify corresponding first and second levels of distribution of said program signal, and wherein said first and second levels of distribution are located remotely from one another.

28. The universal broadcast code encoded program signal of claim 27 wherein one of said levels of distribution of said program signal includes a program originator, and wherein a corresponding distribution level identification data includes the identity of said program originator.

29. The universal broadcast code encoded program signal of claim 27 further comprising at least three segments of said program signal and at least three distribution level identification data encoded within said at least three segments of said program signal, wherein one of said distribution level identification data includes the identity of a network, wherein another of said distribution level identification data includes the identity of a local television or radio station, and wherein still another of said distribution level identification data includes the identity of a television or radio cable system.

30. The universal broadcast code encoded program signal of claim 27 further comprising at least three segments of said program signal and at least three distribution level identification data encoded within said at least three segments of said program signal, wherein one of said distribution level identification data includes the identity of a network, wherein another of said distribution level identification data includes the identity of a local television or radio station, and wherein still another of said distribution level identification data includes the identity of a television or radio satellite system.

31. The universal broadcast code encoded program signal of claim 27 wherein one of said levels of distribution includes a programming source for commercials, promotions, public service announcements, or other media event.

32. The universal broadcast code encoded program signal of claim 27 wherein said distribution level identification data include date and time data.

33. The universal broadcast code encoded program signal of claim 27 wherein said distribution level identification data identifies one of multiple network sources, one of multiple local TV stations, and a satellite or cable system.

34. The universal broadcast code encoded program signal of claim 27 wherein one of said levels of distribution of said program signal includes a television or radio network, and wherein a corresponding one of said distribution level identification data uniquely identifies said television or radio network.

35. The universal broadcast code encoded program signal of claim 27 wherein one of said levels of distribution of said program signal includes a program originator, wherein another of said levels of distribution of said program signal includes a television or radio network, wherein one of said distribution level identification data uniquely identifies said program originator, and wherein another of said distribution level identification data uniquely identifies said television or radio network.

36. The universal broadcast code encoded program signal of claim 27 wherein one of said levels of distribution of said program signal includes a television or radio network, wherein another of said levels of distribution of said program signal includes a local television or radio station, wherein one of said distribution level identification data uniquely identifies said television or radio network, and wherein another of said distribution level identification data uniquely identifies said local television or radio station.

37. The universal broadcast code encoded program signal of claim 27 wherein one of said levels of distribution of said program signal includes a television or radio network or a cable network, wherein another of said levels of distribution of said program signal includes a local television or radio station or a cable system, wherein one of said distribution level identification data uniquely identifies said television or radio network or said cable network, and wherein another of said distribution level identification data uniquely identifies said local television or radio station or said cable system.

38. An universal broadcast code (UBC) encoded television program signal comprising:
at least first and second frames of said television program signal, wherein said first and second frames are different frames of said television program signal; and,
at least first and second distributor identification codes, wherein said first distributor identification code is encoded within the first frame of said television program signal exclusive of the second distributor identification code, wherein said second distributor identification code is encoded within the second frame of said television program signal exclusive of the first distributor identification code, and wherein said first and second distributor identification codes uniquely identify corresponding distributors of said television program signal.

39. The universal broadcast code encoded television program signal of claim 38 wherein one of said distributors of said television program signal includes a television program originator, and wherein a corresponding one of said distributor identification codes includes the identity of said television program originator.

40. The universal broadcast code encoded television program signal of claim 38 further comprising at least three frames of said television program signal and at least three distributor identification codes encoded within said at least three frames of said television program signal, wherein one of said distributor identification codes includes the identity of a television network, wherein another of said distributor identification codes includes the identity of a local television station, and wherein still another of said distributor identification codes includes the identity of a television cable system.

41. The universal broadcast code encoded television program signal of claim 38 further comprising at least three frames of said television program signal and at least three distributor identification codes encoded within said at least three frames of said television program signal, wherein one of said distributor identification codes includes the identity of a television network, wherein another of said distributor identification codes includes the identity of a local television station, and wherein still another of said distributor identification codes includes the identity of a television satellite system.

42. The universal broadcast code encoded television program signal of claim 38 wherein one of said distributors includes a programming source for commercials, promotions, public service announcements, or other media event.

43. The universal broadcast code encoded television program signal of claim 38 wherein said distributor identification codes include date and time data.

44. The universal broadcast code encoded television program signal of claim 38 further comprising at least three frames of said television program signal and at least three distributor identification codes encoded within said at least three frames of said television program signal, wherein one of said distributor identification codes includes the identity of one of multiple television networks, wherein another of said distributor identification codes includes the identity of one of multiple local television stations, and wherein still another of said distributor identification codes includes the identity of a television satellite system.

45. The universal broadcast code encoded television program signal of claim 38 wherein one of said distributors of said television program signal includes a television network, and wherein one of said distributor identification codes uniquely identifies said television network.

46. The universal broadcast code encoded television program signal of claim 38 wherein one of said distributors of said television program signal includes a program originator, wherein another of said distributors of said television program signal includes a television network, wherein one of said distributor identification codes uniquely identifies said program originator, and wherein another of said distributor identification codes uniquely identifies said television network.

47. The universal broadcast code encoded television program signal of claim 38 wherein one of said distributors of said television program signal includes a television network, wherein another of said distributors of said television program signal includes a local television station, wherein one of said distributor identification codes uniquely identifies said television network, and wherein another of said distributor identification codes uniquely identifies said local television station.

48. The universal broadcast code encoded television program signal of claim 38 wherein one of said distributors of said television program signal includes a television network or a cable network, wherein another of said distributors of said television program signal includes a local television station or a cable system, wherein one of said distributor identification codes uniquely identifies said television network or said cable network, and wherein another of said distributor identification codes uniquely identifies said local television station or said cable system.

49. The universal broadcast code encoded television program signal of claim 38 wherein one of said distributor identification codes includes the identity of one of multiple television networks, and wherein another of said distributor identification codes includes the identity of one of multiple local television stations.

50. The universal broadcast code encoded television program signal of claim 38 wherein one of said distributor identification codes includes the identity of one of multiple local television stations, and wherein another of said distributor identification codes includes the identity of a satellite or cable system.

51. The universal broadcast code encoded television program signal of claim 38 wherein one of said distributor identification codes includes the identity of one of multiple television networks, and wherein another of said distributor identification codes includes the identity of a satellite or cable system.

52. A distributor identification code for use in a multi-segment television or radio signal comprising:

first distributor identification data, wherein said first distributor identification data is encoded within a first segment of said multi-segment television or radio signal, wherein said first segment covers a first time period which is equivalent to at least a frame of a television signal, and wherein said first distributor identification data uniquely identifies a corresponding first distributor of said multi-segment television or radio signal; and, second distributor identification data, wherein said second distributor identification data is encoded within a second segment of said multi-segment television or radio signal, wherein said second segment covers a second time period which is equivalent to at least a frame of a television signal, wherein said first and second time periods are different time periods of said multi-segment television or radio signal, and wherein said second distributor identification data uniquely identifies a corresponding second distributor of said multi-segment television or radio signal.

53. The distributor identification code of claim 52 wherein one of said first and second distributors of said multi-segment television or radio signal is a program originator, and wherein a corresponding one of said first and second distributor identification data includes the identity of said program originator.

54. The distributor identification code of claim 52 further comprising third distributor identification data, wherein said third distributor identification data is encoded within a corresponding third segment of said multi-segment television or radio signal, wherein said third distributor identification data uniquely identifies a corresponding third distributor of said multi-segment television or radio signal, wherein one of said first, second, and third distributor identification data includes the identity of a network, wherein another of said first, second, and third distributor identification data includes the identity of a local television or radio station, and wherein still another of said first, second, and third distributor identification data includes the identity of a television or radio cable system.

55. The distributor identification code of claim 52 further comprising third distributor identification data, wherein said third distributor identification data is encoded within a corresponding third segment of said multi-segment television or radio signal, wherein said third distributor identification data uniquely identifies a corresponding third level of distribution of said multi-segment television or radio signal, wherein one of said first, second, and third distributor identification data includes the identity of a network, wherein another of said first, second, and third distributor identification data includes the identity of a local television or radio station, and wherein still another of said first, second, and third distributor identification data includes the identity of a television or radio satellite system.

56. The distributor identification code of claim 52 wherein one of said distributors includes a programming source for commercials, promotions, public service announcements, or other media event.

57. The distributor identification code of claim 52 wherein said distributor identification data include date and time data.

58. The distributor identification code of claim 52 further comprising third distributor identification data, wherein said third distributor identification data is encoded within a corresponding third segment of said multi-segment television or radio signal, wherein said third distributor identification data uniquely identifies a corresponding third level of distribution of said multi-segment television or radio signal, wherein one of said first, second, and third distributor identification data includes the identity of one of multiple network sources, wherein another of said first, second, and third distributor identification data includes the identity of one of multiple local television stations, and wherein still another of said first, second, and third distributor identification data includes the identity of a satellite or cable system.

59. The distributor identification code of claim 52 wherein one of said distributors of said multi-segment television or radio signal includes a television or radio network, and wherein a corresponding one of said first and second distributor identification data uniquely identifies said television or radio network.

60. The distributor identification code of claim 52 wherein one of said distributors of said multi-segment television or radio signal includes a program originator, wherein another of said distributors of said multi-segment television or radio signal includes a television or radio network, wherein one of said first and second distributor identification data uniquely identifies said program originator, and wherein another of said first and second distributor identification data uniquely identifies said television or radio network.

61. The distributor identification code of claim 52 wherein one of said distributors of said multi-segment television or radio signal includes a television or radio network, wherein another of said distributors of said multi-segment television or radio signal includes a local television or radio station, wherein one of said first and second distributor identification data uniquely identifies said television or radio network, and wherein another of said first and second distributor identification data uniquely identifies said local television or radio station.

62. The distributor identification code of claim 52 wherein one of said distributors of said multi-segment television or radio signal includes a television or radio network or a cable network, wherein another of said distributors of said multi-segment television or radio signal includes a local television or radio station or a cable system, wherein one of said first and second distributor identification data uniquely identifies said television or radio network or said cable network, and wherein another of said first and second distributor identification data uniquely identifies said local television or radio station or said cable system.

63. A method of determining distributors of a multi-segment video or audio signal comprising the steps of:

detecting first distributor identification data encoded in a first segment of said multi-segment video or audio signal so as to uniquely identify a corresponding first distributor of said multi-segment video or audio signal, wherein said first segment is at least 1/30th second in length; and, detecting second distributor identification data encoded in a second segment of said multi-segment video or audio signal to uniquely identify a corresponding second distributor of said multi-segment video or audio signal; wherein said second segment is at least 1/30th second in length, and wherein the first and second segments are different segments.

64. The method of claim 63 wherein said step of detecting first distributor identification data includes the step of detecting date and time data encoded in said first segment of said multi-segment video or audio signal.

65. The method of claim 63 wherein said step of detecting second distributor identification data includes the step of detecting date and time data encoded in said second segment of said multi-segment video or audio signal.

66. A distributor identification code for use in a broadcast media signal comprising:

first distributor identification data, said first distributor identification data being encoded in said broadcast media signal and uniquely identifying a corresponding first distributor of said broadcast media signal; and, second distributor identification data, said second distributor identification data being encoded in said broadcast media signal and uniquely identifying a corresponding second distributor of said broadcast media signal, said first and second identification data being serially encoded in said broadcast media signal.

67. The distributor identification code of claim 66 wherein one of said first and second distributors of said broadcast media signal is a program originator, and wherein a corresponding one of said first and second distributor identification data includes the identity of said program originator.

68. The distributor identification code of claim 66 further comprising third distributor identification data, wherein said third distributor identification data is encoded in said broadcast media signal and uniquely identifies a corresponding third distributor of said broadcast media signal, wherein one of said first, second and third distributor identification data includes the identity of a network, wherein another of said first, second and third distributor identification data includes the identity of a local television or radio station, and wherein another of said first, second and third distributor identification data includes the identity of a cable system.

69. The distributor identification code of claim 66 further comprising third distributor identification data, wherein said third distributor identification data is encoded in said broadcast media signal and uniquely identifies a corresponding third distributor of said broadcast media signal, wherein one of said first, second and third distributor identification data includes the identity of a network, wherein another of said first, second and third distributor identification data includes the identity of a local television or radio station, and wherein another of said first, second and third distributor identification data includes the identity of a satellite system.

70. The distributor identification code of claim 66 wherein one of said distributors is a programming source for commercials, promotions, public service announcements, or other media event.

71. The distributor identification code of claim 66 wherein said distributor identification data include date and time data.

72. The distributor identification code of claim 66 further comprising third distributor identification data, wherein said third distributor identification data is encoded in said broadcast media signal and uniquely identifies a corresponding third distributor of said broadcast media signal, wherein one of said first, second and third distributor identification data includes the identity of one of multiple network sources, wherein another of said first, second and third distributor identification data includes the identity of one of multiple local television stations, and wherein another of said first, second and third distributor identification data includes the identity of a satellite or cable system.

73. The distributor identification code of claim 66 wherein one of said distributors of said broadcast media signal is a television or radio network and wherein a corresponding one of said first and second distributor identification data uniquely identifies said television or radio network.

74. The distributor identification code of claim 66 wherein one of said distributors of said broadcast media signal is a program originator and another of said distributors of said broadcast media signal is a television or radio network, wherein one of said first and second distributor identification data uniquely identifies said program originator and another of said first and second distributor level identification data uniquely identifies said television or radio network.

75. The distributor identification code of claim 66 wherein one of said distributors of said broadcast media signal is a television or radio network and another of said distributors of said broadcast media signal is a local television or radio station, wherein one of said first and second distributor identification data uniquely identifies said television or radio network and another of said first and second distributor identification data uniquely identifies said television or radio station.

76. The distributor identification code of claim 66 wherein one of said distributors of said broadcast media signal is a television or radio network or a cable network and another of said distributors of said broadcast media signal is a local television or radio station or a cable system, wherein one of said first and second distributor identification data uniquely identifies said television or radio network or said cable network and another of said first and second distributor identification data uniquely identifies said television or radio station or said cable system.

77. A method of determining distributors of a broadcast media signal comprising the steps of:

detecting first distributor identification data encoded in said broadcast media signal to uniquely identify a corresponding first distributor of said broadcast media signal; and, detecting second distributor identification data encoded in said broadcast media signal to uniquely identify a corresponding second distributor of said broadcast media data, wherein said first and second distributor identification data are serially encoded in said broadcast media signal.

78. The method of claim 77 wherein said step of detecting first distributor identification data includes the step of detecting date and time data encoded in said broadcast media signal.

79. The method of claim 77 wherein said step of detecting second distributor identification data includes the step of detecting date and time data encoded in said broadcast media signal.

* * * * *